(12) United States Patent
Han et al.

(10) Patent No.: US 7,846,578 B2
(45) Date of Patent: Dec. 7, 2010

(54) RECHARGEABLE BATTERY

(75) Inventors: Dae-Won Han, Suwon-si (KR);
Yong-Sam Kim, Suwon-si (KR);
Sang-Won Byun, Suwon-si (KR);
Byung-Kyu Ahn, Suwon-si (KR);
Sung-Bae Kim, Suwon-si (KR); Ki-Ho Kim, Suwon-si (KR); Zin Park, Suwon-si (KR); Masanori Kogure, Suwon-si (KR); Seok-Joon Yoon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1 day.

(21) Appl. No.: 12/364,787

(22) Filed: Feb. 3, 2009

(65) Prior Publication Data
US 2009/0280403 A1 Nov. 12, 2009

(30) Foreign Application Priority Data
May 7, 2008 (KR) ...................... 10-2008-0042399

(51) Int. Cl.
*H01M 2/02* (2006.01)
(52) U.S. Cl. ...................................... 429/164; 429/163
(58) Field of Classification Search ........................ None
See application file for complete search history.

(56) References Cited

U.S. PATENT DOCUMENTS

2007/0269711 A1* 11/2007 Meguro et al. ................ 429/94
2008/0241646 A1* 10/2008 Sawa et al. .................... 429/94

FOREIGN PATENT DOCUMENTS

| JP | 08273697 | * | 10/1996 |
| JP | 11204140 | * | 7/1999 |
| JP | 2000251875 | * | 9/2000 |
| JP | 2007006528 | * | 3/2007 |
| KR | 10-2007-0084079 | | 8/2007 |
| KR | 1020070090499 | * | 9/2007 |

OTHER PUBLICATIONS

Korean Notice of Allowance dated Jun. 28, 2010, issued in corresponding Korean Patent Application No. 10-2008-0042399.

* cited by examiner

*Primary Examiner*—Raymond Alejandro
*Assistant Examiner*—Maria J Laios
(74) *Attorney, Agent, or Firm*—Knobbe Martens Olson & Bear LLP (57) ABSTRACT

A rechargeable battery including an electrode assembly, a case, a cap assembly, and a core. The electrode assembly includes an anode, a cathode, and a separator interposed between the anode and the cathode. The case has a space for housing the electrode assembly. The cap assembly is connected to the case and electrically connected to the electrode assembly. The core is disposed inside the electrode assembly, and has a distance between the exterior and the center thereof at one end in a length direction that is greater than a distance between the exterior and the center thereof at the center in the length direction.

17 Claims, 8 Drawing Sheets

RECHARGEABLE BATTERY

CROSS-REFERENCE TO RELATED APPLICATION

This application claims the benefit of Korean Patent Application No. 2008-42399, filed May 7, 2008 in the Korean Intellectual Property Office, the disclosure of which is incorporated herein by reference.

BACKGROUND OF THE INVENTION

1. Field of the Invention

Aspects of the present invention relate to a rechargeable battery. More particularly, aspects of the present invention relate to a rechargeable battery having an improved core structure disposed in an electrode assembly.

2. Description of the Related Art

A rechargeable battery can be discharged in use and recharged, unlike a primary battery that cannot be recharged. A low-capacity rechargeable battery is formed of one cell. Low-capacity rechargeable batteries have been used for portable small electronic devices such as mobile phones, laptop computers and camcorders. A large capacity rechargeable battery includes a plurality of cells that are connected in a form of a pack. Large capacity rechargeable batteries have been widely used as power sources for driving, as an example, the electric motor of a hybrid electric vehicle.

Rechargeable batteries been manufactured in various shapes. Representative shapes thereof are a cylindrical shape and a square shape. Rechargeable batteries are connected in series to form a large capacity rechargeable battery module in order to drive the motor of an electric vehicle or the electric motor of a hybrid electric vehicle, both requiring a large amount of electric power.

A rechargeable battery internally includes an electrode assembly having an anode and a cathode with a separator interposed, a case providing a space for housing the electrode assembly, and a cap assembly for closing and sealing the case.

The anode and the cathode are formed in a belt shape that extends in one direction, and include an uncoated part at one end in the length direction. The uncoated part is a part that is not coated with an active material.

The electrode assembly is spiral-wound around a core of a cylinder shape with the separator interposed between the anode and the cathode. That is, the electrode assembly basically forms a cylinder shape. Here, the anode uncoated part and the cathode uncoated part are disposed to face different directions. The core not only supports the electrode assembly in a winding process, but also sustains the shape of the spiral-wound electrode assembly.

The cathode uncoated part includes a cathode current collector plate, and the anode uncoated part includes an anode current collector plate. The cathode current collector plate is electrically connected to the case, and the anode current collector plate is electrically connected to the cap assembly, thereby providing current to the outside.

As the rechargeable battery is charged and discharged repeatedly, the electrode assembly gradually expands. Accordingly, stress between the electrode assembly and the case and between the electrode assembly and the core increases. Since there is generally enough margin space between the case and the electrode assembly, there is no great stress generated therebetween. However, comparatively large stress is generated between the electrode assembly and the core because there is no margin space therebetween.

If stress is concentrated between the electrode assembly and the core, the output of the rechargeable battery is reduced because charging and discharging efficiency deteriorates. Also, the life-span of a part with concentrated stress deteriorates and unstable reaction is thereby generated. Therefore, the life-span of the rechargeable battery is reduced due to the unstable reaction.

The above information disclosed in this Background section is only for enhancement of understanding of the background of the invention and therefore it may contain information that does not form the prior art that is already known in this country to a person of ordinary skill in the art.

SUMMARY OF THE INVENTION

Aspects of the present invention provide a rechargeable battery having the advantage of an improved structure for minimizing stress between an electrode assembly and a core.

An example embodiment of the present invention provides a rechargeable battery including an electrode assembly, a case, a cap assembly, and a core. The electrode assembly includes an anode, a cathode, and a separator interposed between the anode and the cathode. The case has a space for housing the electrode assembly. The cap assembly is connected to the case and electrically connected to the electrode assembly. The core is disposed inside the electrode assembly, and has a distance between the exterior and the center thereof at one end in a length direction that is greater than the distance between the exterior and the center thereof at the center in the length direction.

The distance from the exterior to the center of the core may gradually decrease when approaching the central part thereof in the length direction, and the core may have an external circumferential surface that is concavely curved. The core may include support members having a constant exterior diameter, and a variable member having a distance from the exterior to the center thereof of the core that decreases when approaching the central part of the length direction of the core.

The support members may be disposed at respective ends of the length direction of the core, and the variable member may be disposed between the support members. A cross-section of the variable member may be formed in an arc shape, and the distance from the exterior to the center of the core may decrease linearly in the variable member.

A connection member for connecting variable members may be disposed inward of the variable members in the length direction of the core, and the connection member may have a uniform exterior diameter. A distance r from the center of the core to the exterior thereof having a minimum exterior diameter and a distance R from the center of the core to the exterior thereof having a maximum exterior diameter may satisfy the equation $0.7 \leq r/R \leq 0.99$.

The exterior of the core may be concavely curved corresponding to expansion of the electrode assembly, and the exterior of the core may have a circular cross-section. A plurality of holes may be formed at the exterior of the core, and the holes may be disposed at the center of the core and connected in the length direction of the core. The plurality of holes may be arranged at a predetermined distance in an external circumferential direction of the core.

Since a space is formed between the core and the electrode assembly by a recessed portion formed at the core, stress between the electrode and the core can be reduced. Accordingly, it is possible to minimize output deterioration of the rechargeable battery.

Also, it is possible to easily reduce stress that is greatly generated at a center portion by forming the support members at both ends of the core and the variable member at the center thereof. Furthermore, structural stability can be sustained because the support members stably support the electrode assembly.

Furthermore, the support members are formed at both ends of the core, the variable members are formed at the center thereof, and the connection member is formed between the variable members. Therefore, stress between the electrode assembly and the core can be minimized.

Moreover, holes are formed at the core to allow elastic deformation. Therefore the output deterioration can be minimized by reducing the stress between the core and the electrode assembly.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
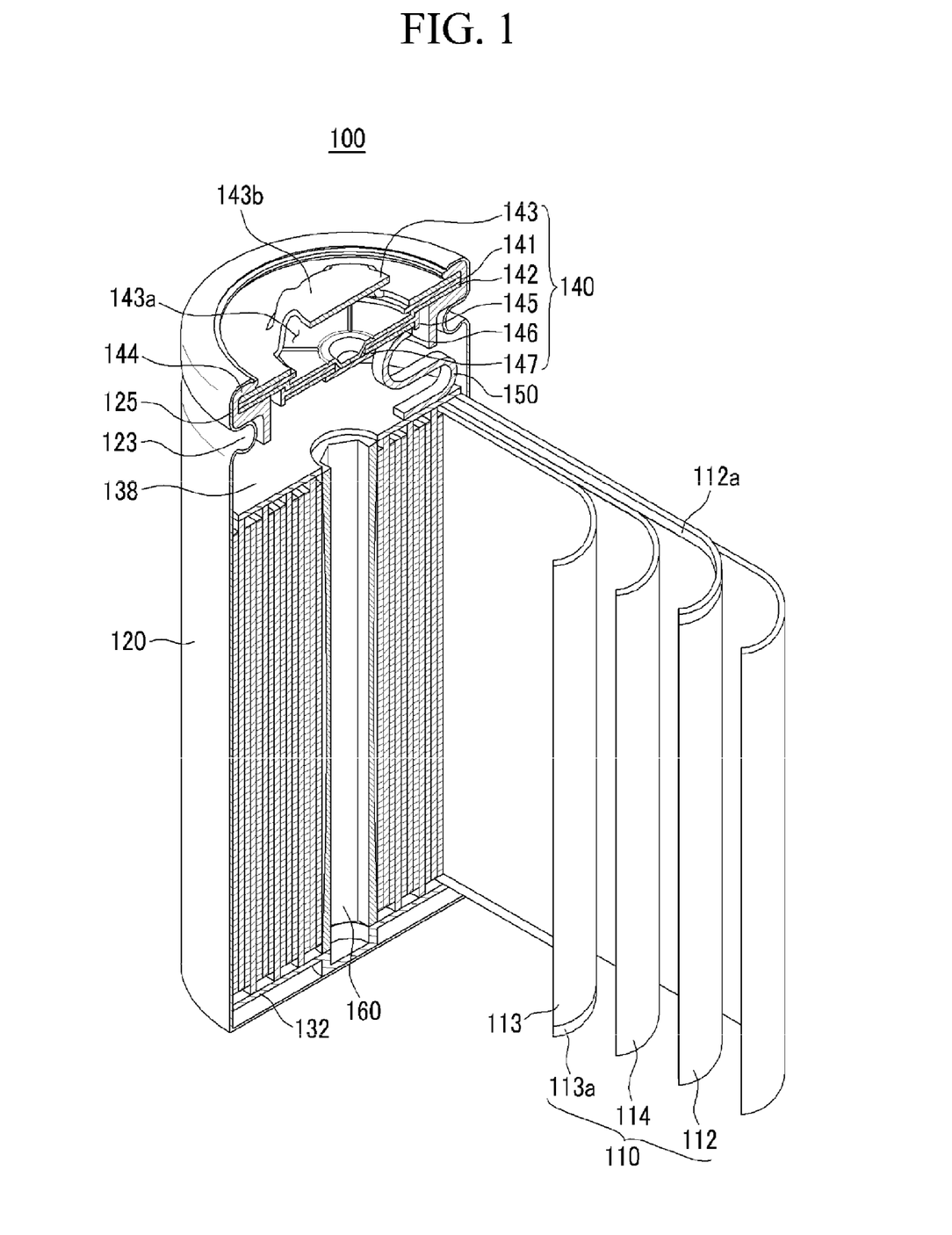
FIG. 1 is a cross-sectional perspective view of a rechargeable battery according to a first example embodiment of the present invention.

FIG. 1 is a cross-sectional perspective view of a rechargeable battery according to a first example embodiment of the present invention. The rechargeable battery 100 includes an electrode assembly 110 and a case 120. The electrode assembly 110 includes an anode 112, a cathode 113, and a separator 114 interposed between the anode 112 and the cathode 113. The case 120 includes an opening at one end thereof for housing the electrode assembly 110 along with an electrolyte solution. A cap assembly 140 is disposed at the opening of the case 120 for sealing the case 120 with a gasket 144 as an interface.

The case 120 is made of a conductive metal such as aluminum, an aluminum alloy, or nickel-plated steel. The case 120 according to the first example embodiment has a cylindrical shape having an internal space for housing the electrode assembly 110. After inserting the cap assembly 140 in the case 120, the cap assembly 140 is fixed to the case through clamping. In this process, a beading unit 123 and a clamping unit 125 are formed in the case 120.

The electrode assembly 110 according to the first example embodiment may be formed as a cylindrical type in which the anode 112, the separator 114, and the cathode 113 are stacked and spiral-wound. However, the structure of the electrode assembly 110 is not limited thereto. The electrode assembly 110 may be formed in different structures such as a prismatic or pouch shape. For a cylindrical type rechargeable battery 100, a space is formed at the center of the electrode assembly 110, and a core 160 is disposed in the space to sustain the cylindrical shape of the electrode assembly 110.

An anode uncoated part 112a is formed at a top end of the anode 112 and is electrically connected to an anode current collector plate 138. The anode uncoated part 112a is a part that is not coated with an anode active material. Also, a cathode uncoated part 113a is formed at a bottom end of the cathode 113 and is electrically connected to a cathode current collector plate 132. The cathode uncoated part 113a is a part that is not coated with a cathode active material.

Although the anode current collector plate 138 is disposed at an upper part and the cathode current collector plate 132 is disposed at a lower part in this example embodiment, the present invention is not limited thereto. For example, the anode current collector plate 138 may be disposed at a lower part and the cathode current collector plate 132 may be disposed at an upper part.

The cap assembly 140 includes a cap plate 143 and a vent plate 142 disposed under the cap plate 143. The cap plate 143 includes a protruding outer terminal 143b and an exhaust pipe 143a. The vent plate 142 breaks at a predetermined pressure condition to discharge gas. The vent plate 142 interrupts electrical connection between the electrode assembly 110 and the cap plate 143 at the predetermined pressure condition.

A positive temperature coefficient element 141 is disposed between the cap plate 143 and the vent plate 142. The positive temperature coefficient element 141 is a device having electrical resistance that increases infinitely when it exceeds a predetermined temperature. Therefore, the positive temperature coefficient element 141 interrupts charge current flow or discharge current flow when the temperature of the rechargeable battery 100 exceeds a predetermined temperature.

The vent plate 142 has a structure protruding in a downward direction, and a sub-plate 147 is attached at a bottom side of the protruding part. A middle plate 146 is disposed at an edge of the vent plate 142. The middle plate 146 is electrically connected to the electrode assembly 110 through a lead unit 150 and fixed at the sub-plate 147. An insulator 145 is disposed between the middle plate 146 and the vent plate 142 for insulating the middle plate 146 from the vent plate 142.

Figure 2:
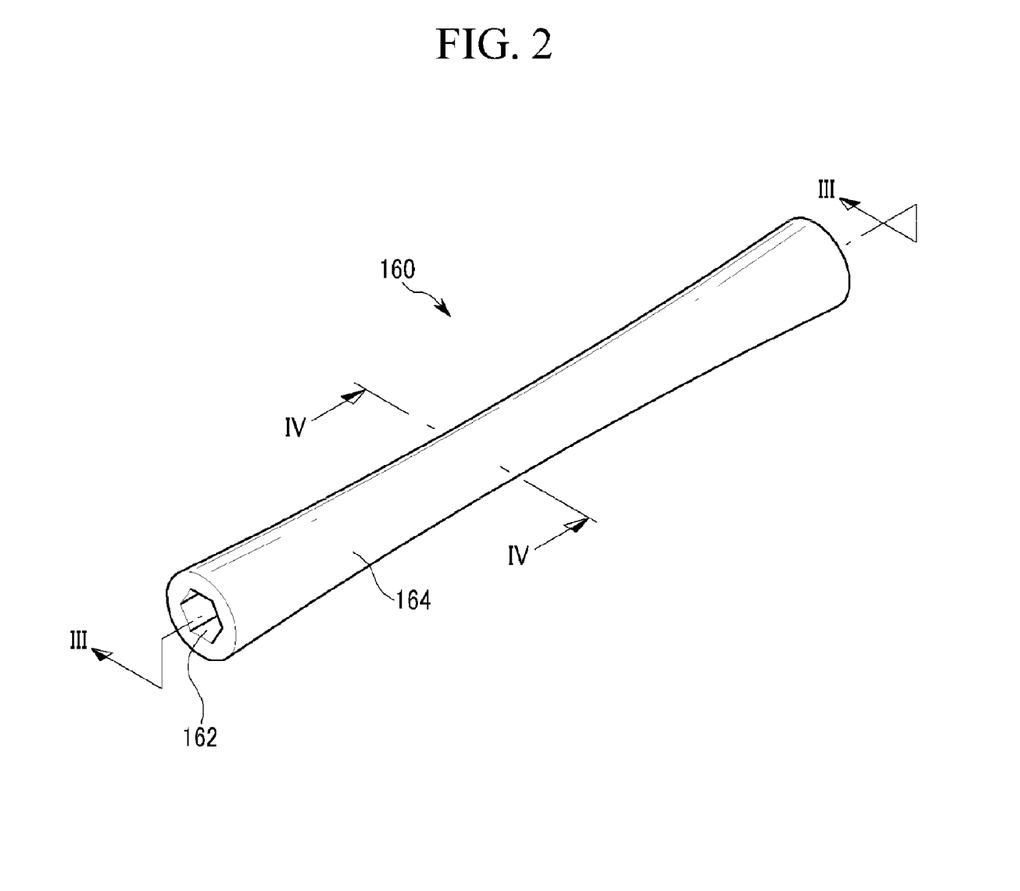
FIG. 2 is a perspective view illustrating a core of a rechargeable battery according to the first example embodiment of the present invention.
Figure 3:
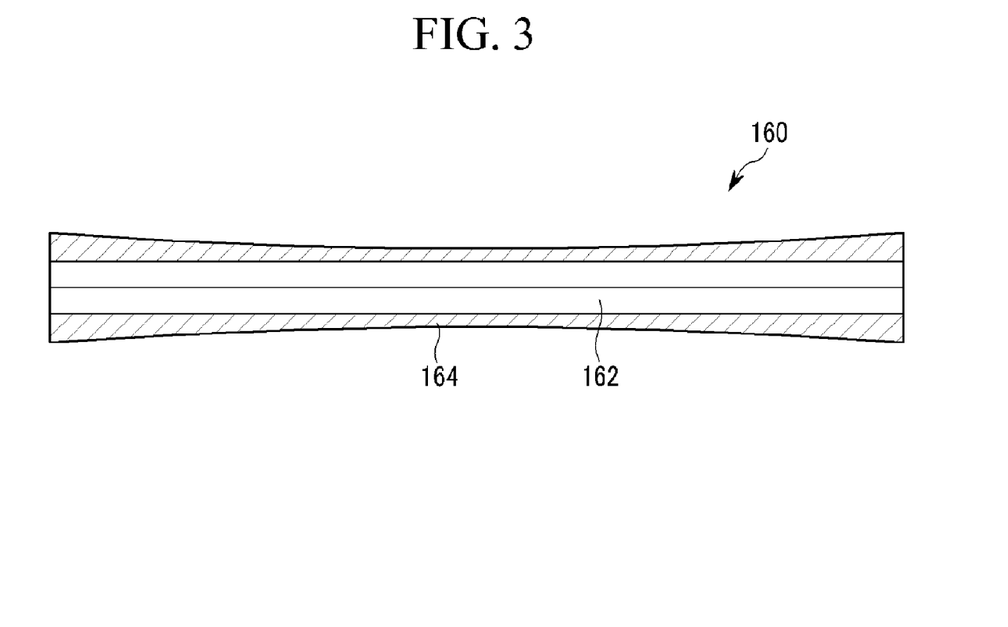
FIG. 3 is a cross-sectional view of FIG. 2 taken along the line III-III.
Figure 4:
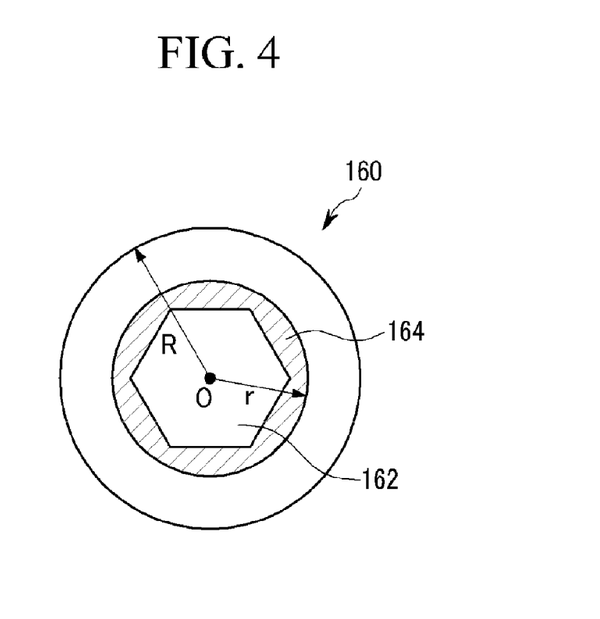
FIG. 4 is a cross-sectional view of FIG. 2 taken along the line IV-IV.

FIG. 2 is a perspective view illustrating a core of a rechargeable battery according to the first example embodiment of the present invention, FIG. 3 is a cross-sectional view of FIG. 2 taken along the line III-III and FIG. 4 is a cross-sectional view of FIG. 2 taken along line IV-IV. Referring to FIGS. 2 through 4, the core 160 is formed in a cylinder shape with variations. The core 160 includes a hollow or internal cylinder 162 and an outer cylinder with a recessed portion 164. The hollow 162 penetrates the core 160 in the length direction. The recessed portion 164 is disposed at an external circumference of the core 160 and is concave toward the center of the core 160. Although the cross-section of the core 160 is a circle in the present example embodiment, the present invention is not limited thereto.

The hollow 162 basically has a hexagonal cross-section and extends from one end of the core 160 to the other end. However, the present invention is not limited thereto. The hollow 162 may have various shapes of cross-sections such as a polygon or an oval in addition to a circle.

The recessed portion 164 is formed to be concave toward the center of the core 160 in the width direction as it approaches the central portion of the core 160 in the length direction. Therefore, the exterior diameter of the core 160 gradually decreases toward the central portion of the core 160 in the length direction. Also, the recessed portion 164 has a curved structure like an arc. Accordingly, the exterior diameter of the core 160 becomes the smallest at the center of the core 160 in the length direction. Therefore, the core 160 has larger exterior diameters at both ends than at the center in the length direction. However, the core 160 may be formed to have an exterior diameter that decreases linearly.

Because of the recessed portion 164, a margin space is formed between the electrode assembly 110 and the core 160 when the electrode assembly 110 and the core 160 are initially disposed. The margin space may operate as a buffer when the electrode assembly 110 expands.

In particular, the electrode assembly 110 greatly expands at the central portion in the length direction. If the recessed portion 164 is formed to be concave like an arc as described above, a space between the core 160 and the electrode 110 becomes larger approaching the center. Therefore, it is possible to effectively reduce stress generated between the electrode assembly 110 and the core 160 at the center where the electrode assembly 110 greatly expands compared to other portions.

FIG. 4 is a cross-sectional view of the core 160 taken at the center of the length direction. The core 160 has the smallest exterior diameter at the center of the length direction. When O denotes the center of the core 160 in the width direction, r denotes the distance from the center O of the core 160 to the minimum exterior diameter, and R denotes the distance from the center O of the core to the maximum exterior diameter, r/R satisfies Equation 1.

$$0.7 \leq r/R \leq 0.99$$ [Equation 1]

If r/R is larger than 0.99, the space between the electrode assembly 110 and the core 160 becomes smaller. Therefore, stress is excessively generated between the core 160 and the electrode assembly 110 when the electrode assembly 110 expands. If r/R is smaller than 0.7, the core 160 cannot stably support the shape of the electrode assembly 110. Therefore, the structural stability may deteriorate. Since the hollow 162 is formed inside the core 160 to allow insertion of a mandrill during spiral-winding, r must be larger than the maximum distance from the center O to the hollow 162.

Figure 5:
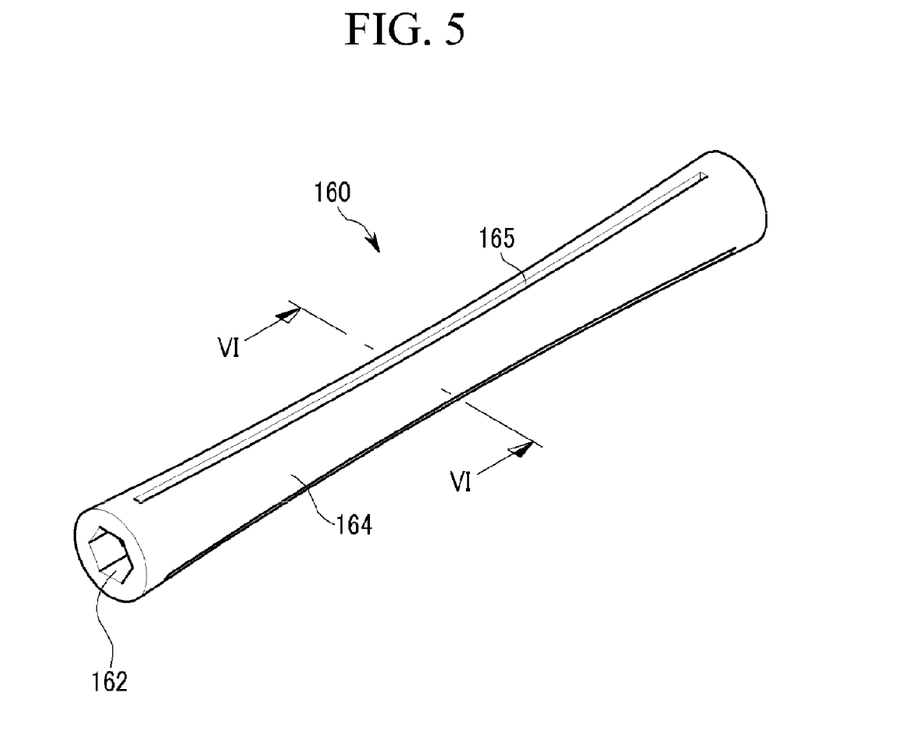
FIG. 5 is a perspective view illustrating a core of a rechargeable battery according to a variation of the first example embodiment.
Figure 6:
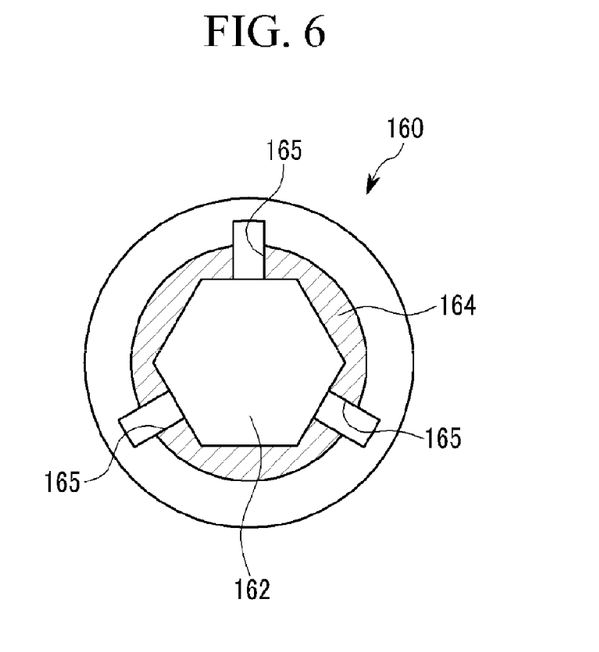
FIG. 6 is a cross-sectional view of a core of FIG. 5 taken along the line VI-VI.

FIG. 5 is a perspective view illustrating a core of a rechargeable battery according to a variation of the first exemplary embodiment, and FIG. 6 is a cross-sectional view of the core of FIG. 5 taken along the line VI-VI. A plurality of holes 165 is formed on an external circumference of the core 160. The plurality of holes 165 penetrates through the core 160 to the hollow 162. The plurality of holes 165 extends in the length direction of the core 160. Both ends of each hole 165 in the length direction are disposed interior to the ends of the core 160. The plurality of holes 165 connects the exterior of the core 160 and the hollow 162 and is disposed at the center of the core 160 in the length direction. Also, the plurality of holes 165 is disposed in an external circumference direction of the core 160 at a predetermined distance from each other, and in this embodiment three consecutive holes 165 are arranged at uniform intervals in the external circumference direction of the core 160. However, the number of holes 165 can be varied depending on the widths and shapes of the holes 165. In one further embodiment, only one hole 165 is formed in the external circumference of the core 160.

If the holes 165 are formed at the core 160 as described above, the core 160 can be elastically deformed at portions having the holes 165. Accordingly, it is possible to reduce stress generated between the core 160 and the electrode assembly 110 because the core 160 is elastically deformed if the electrode assembly 110 pressurizes the core 160 when the electrode 110 expands.

The holes 165 are not formed at either end of the core 160 in the length direction. These parts support the electrode assembly. Ends of the electrode assembly 110 are respectively fixed to the anode current collector plate 138 and the cathode current collector plate 132 through welding. The welding parts of the electrode assembly 100 and the current collector plates 132 may be broken if the end of the electrode assembly 100 in the length direction expands inwardly due to deformation of both ends of the core 160. In the present example embodiment, the holes 165 are not formed at the end of the electrode assembly 110 to prevent deformation at the end of the electrode assembly 100.

Figure 7:
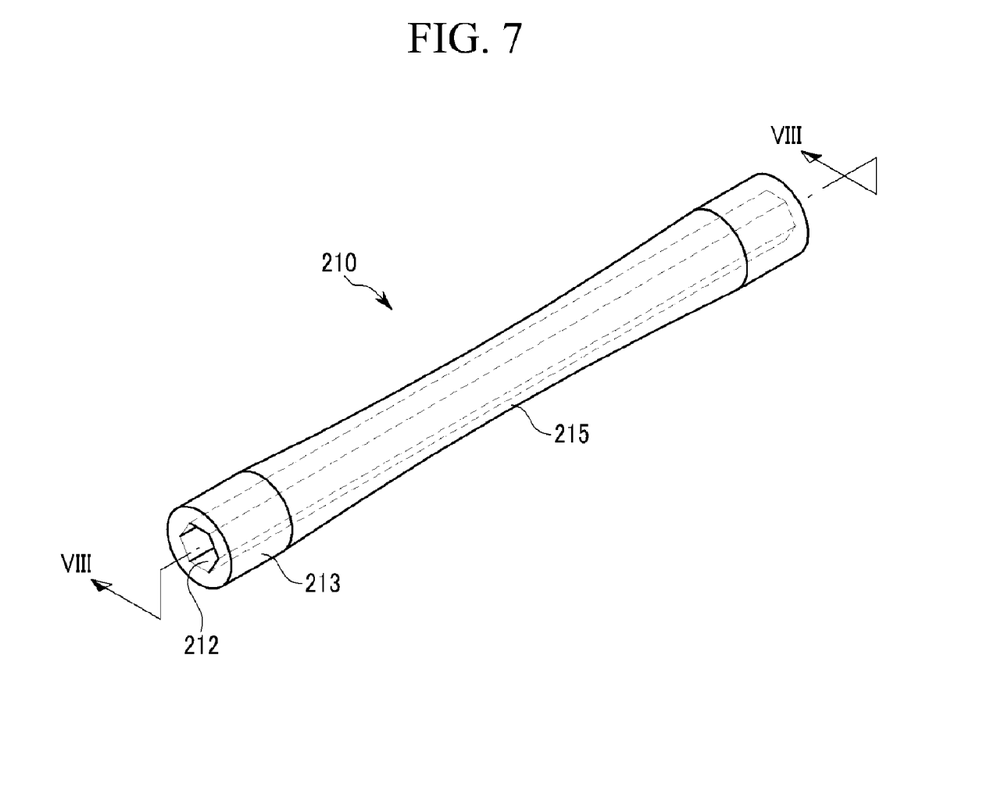
FIG. 7 is a perspective view illustrating a core of a rechargeable battery according to a second example embodiment of the present invention.
Figure 8:
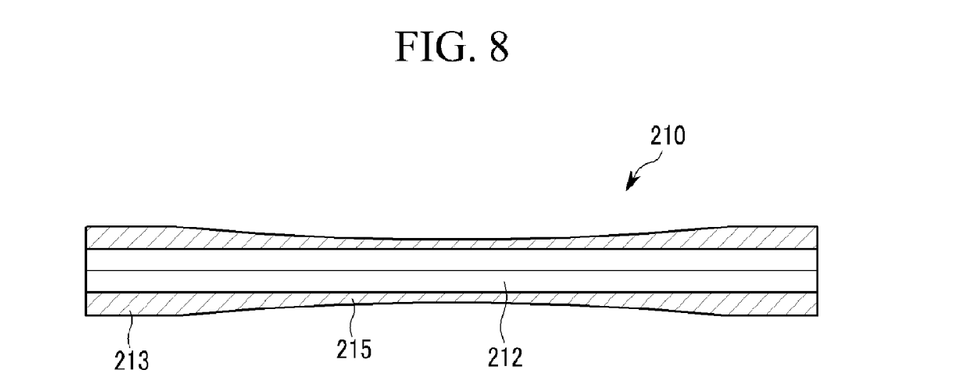
FIG. 8 is a cross-sectional view of a core of FIG. 7 taken along the line VIII-VIII.

FIG. 7 is a perspective view illustrating a core of a rechargeable battery according to a second example embodiment of the present invention, and FIG. 8 is a cross-sectional view of a core of FIG. 7 taken along the line VIII-VIII. A core 210 is formed in a cylindrical shape with variations and includes a hollow 212 that penetrates the core 210 in the length direction. The exterior of the core 210 has a circular cross-section. The core 210 includes support members 213 where the exterior diameter is maintained at a constant, and a variable member 215 connected to the support members 213 where the exterior diameter thereof gradually decreases toward the center in the length direction.

The support members 213 are disposed at both ends of the core 160, and the variable member 215 is disposed between the support members 213. The variable member 215 has a maximum exterior diameter identical to that of the support members 213, and the exterior diameter of the variable member 215 gradually decreases farther from the support members. The cross-section of the variable member 215 is an arc shape and has a minimum exterior diameter at the center thereof. As in FIGS. 2 through 4, Formula 1 applies for the ratio r to R (not shown here) and the hollow 212 can have a variety of shapes, including cylindrical.

The support members 213 formed at both ends of the core 210 according to the present example embodiment stably support the electrode assembly 110 and improve the structural stability of the rechargeable battery 100. As described above, the electrode assembly 110 expands more at the central portion thereof. In the present embodiment, maximum space can be secured by further bending a portion of the core 210 where the electrode assembly 110 greatly expands. The ends of the electrode assembly 110 where it expands comparatively less are supported by the support members 213, thereby structurally stabilizing the rechargeable battery. Also, respective ends of the electrode assembly 110 are fixed at the anode current collector plate 138 and the cathode current collector plate 132 through welding. If the ends of the electrode assembly 110 in the length direction expand inwardly due to deformation of both ends of the core 160, the electrode assembly 110 and the current collector plates 132 and 138 may be broken from the welds. Therefore, the support members 213 are formed at the ends of the core 210 in the present example embodiment to protect the ends of the electrode assembly 110 from deformation.

Figure 9:
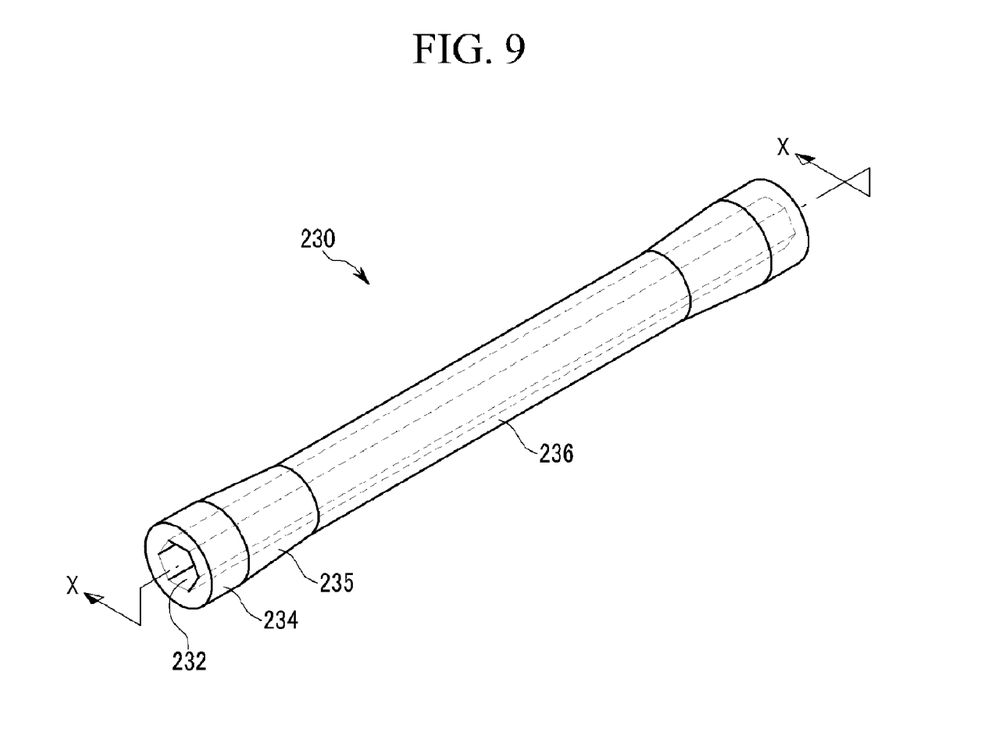
FIG. 9 is a perspective view illustrating a core of a rechargeable battery according to the third example embodiment of the present invention.
Figure 10:
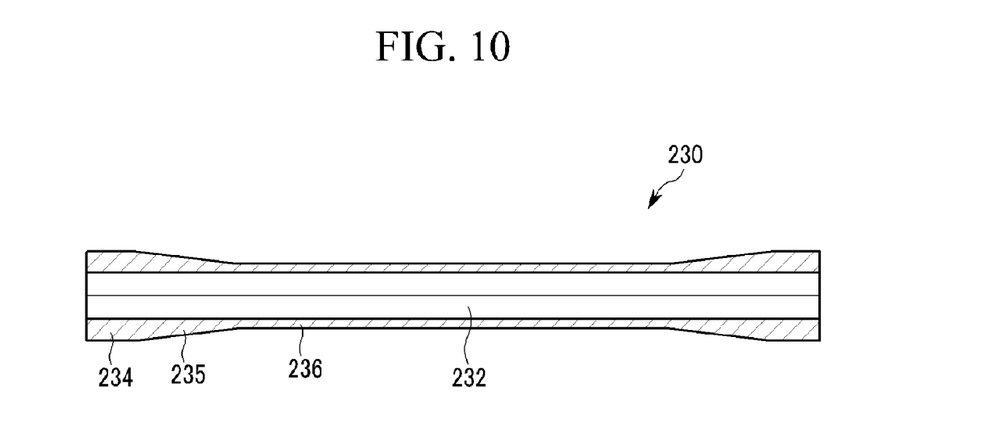
FIG. 10 is a cross-sectional view of a core of FIG. 9 taken along the line X-X.

FIG. 9 is a perspective view illustrating a core of a rechargeable battery according to a third example embodiment of the present invention, and FIG. 10 is a cross-sectional view of a core of FIG. 9 taken along the line X-X. A core 230 according to the present example embodiment is formed in a cylindrical shape with variations and includes a hollow 232 that penetrates through the core 230 in the length direction. The exterior of the core 230 has a circular cross-section. The core 230 includes support members 234 having a constant exterior diameter, variable members 235 connected to the support members 234 and having a gradually decreasing exterior diameter toward the center in the length direction, and a connection member 236 formed between the variable members 235.

The support members 234 are disposed at both ends of the core 230, and the variable members 235 are disposed between the support members 234. The connection member 236 connects the variable members 235 between the support members 234, and has a constant exterior diameter. The maximum exterior diameters of the variable members 235 are identical to the exterior diameters of the support members 234. The exterior diameters of the variable members 235 gradually decrease further from the support members 234. In the variable members 235, the exterior diameter of the core 230 decreases linearly. The minimum exterior diameter of the variable members 235 is equal to the exterior diameter of the connection member 236.

As described above, the core 230 according to the present example embodiment includes two support members 234 at respective ends, variable members 235 having an exterior diameter that decreases between the support members 234 and the connection member 236 having the constant exterior diameter between the variable members 235. Therefore, the stress generated between the electrode assembly 110 and the core 230 can be stably reduced. As in FIGS. 2 through 4, Formula 1 applies for the ratio r to R (not shown here) and the hollow 232 can have a variety of shapes, including cylindrical.

When the electrode assembly 110 expands as the rechargeable battery 100 is charged and discharged repeatedly, the electrode assembly 110 greatly expands at the inward side thereof. The expansion degree thereof gradually increases from the end of the electrode assembly 110 to the inward side thereof in the length direction until it reaches a certain point. The expansion degree becomes uniform from the certain point. Therefore, if the exterior of the core 230 is formed to be concave corresponding to the expansion of the electrode assembly 110 as shown in the present exemplary embodiment, the stress between the electrode assembly 110 and the core 230 can be minimized.

Figure 11:
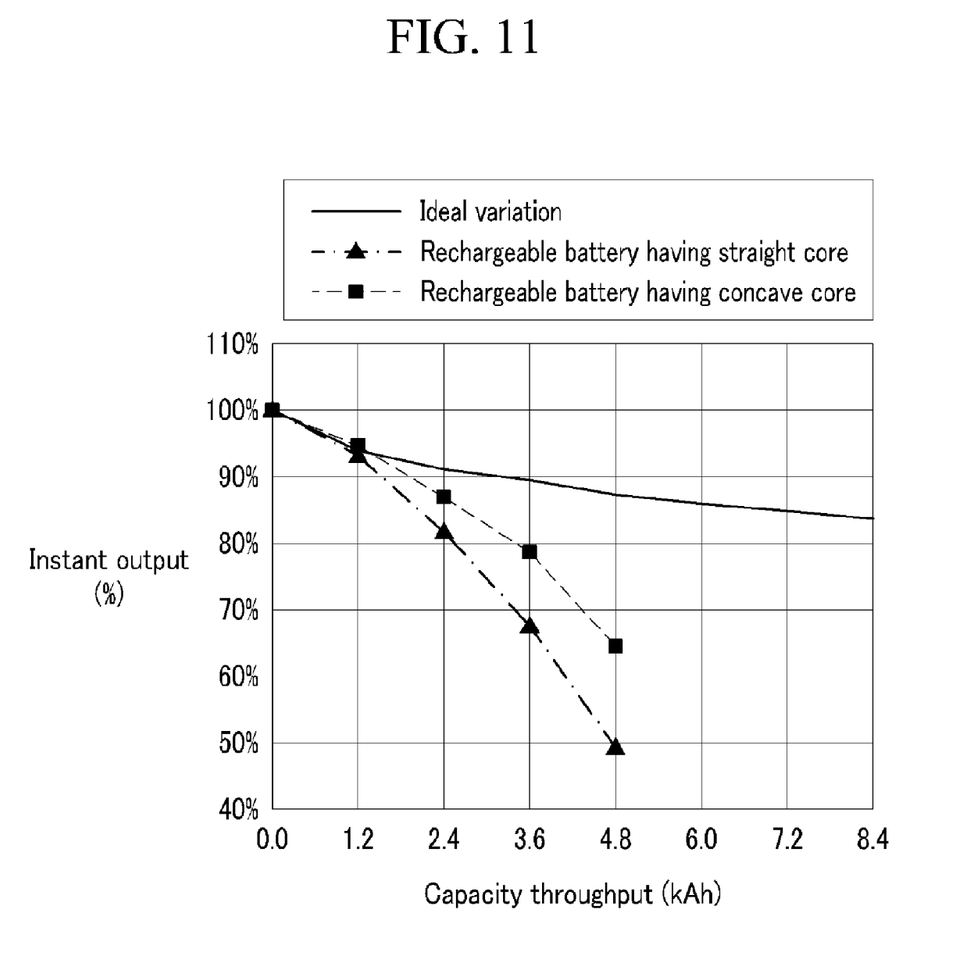
FIG. 11 is a graph illustrating instant output variation as a function of capacity throughput of a rechargeable battery according to the first example embodiment of the present invention.
Figure 12:
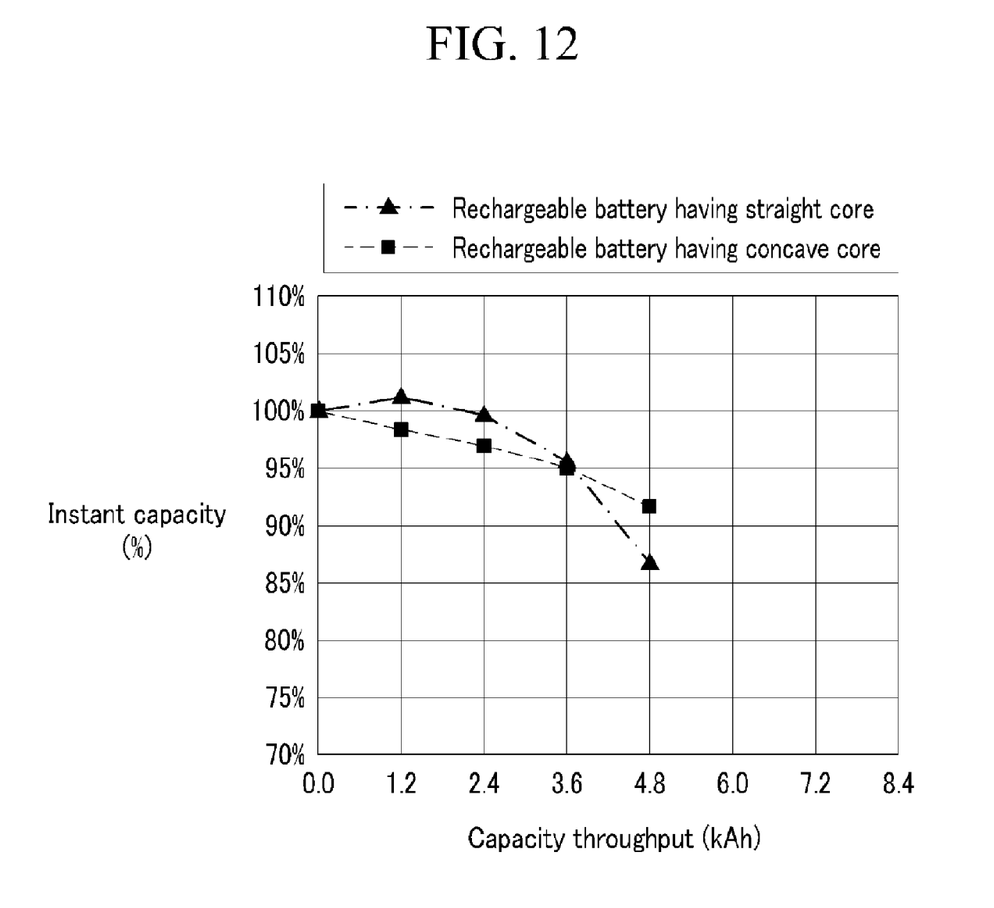
FIG. 12 is a graph showing instant capacity variation as a function of throughput of a rechargeable battery according to the first example embodiment of the present invention.

FIG. 11 is a graph illustrating instant output variation as a function of capacity throughput of a rechargeable battery according to the first example embodiment of the present invention, and FIG. 12 is a graph showing instant capacity variation as a function of capacity throughput of a rechargeable battery according to the first example embodiment of the present invention. A simulation uses a core 160 having a maximum exterior diameter of about 80 mm and a minimum exterior diameter of about 78 mm. Capacity throughput is a value obtained by accumulating current outputted by repeating charging and discharging a rechargeable battery. Therefore, an increment of the capacity throughput leads to an increased number of available cycles of charging and discharging.

As shown in FIG. 11, the instant output of the rechargeable battery 100 gradually decreases by repeating charging and discharging. The graph clearly shows that the instant output of the rechargeable battery having the concave core 160 according to the first exemplary embodiment of the present invention decreases slower than that of a rechargeable battery having a typical straight core.

As shown in FIG. 12, the instant capacity of the rechargeable battery 100 gradually decreases by repeating charging and discharging. Although a rechargeable battery having a typical straight core has a larger instant capacity, the decreasing slope of the instant capacity gradually increases. However, the rechargeable battery 100 having the concave core 160 according to the first example embodiment of the present invention has a decreasing slope of the instant capacity that is less than the straight core for higher capacity throughputs.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A rechargeable battery comprising:
   an electrode assembly having an anode, a cathode, and a separator interposed between the anode and the cathode;
   a case having a space for housing the electrode assembly;
   a cap assembly connected to the case and electrically connected to the electrode assembly; and
   a core disposed inside the electrode assembly and having a distance between the exterior and the center thereof at the ends in the length direction that is greater than a distance between the exterior and the center thereof at the center in the length direction, wherein the core includes:
   support members having a constant exterior diameter, and
   a variable member having a distance from the exterior to the center thereof that decreases when approaching the central part of the length direction of the core.

2. The rechargeable battery of claim 1, wherein the distance from the exterior to the center of the core gradually decreases when approaching the central part thereof in the length direction.

3. The rechargeable battery of claim 2, wherein the core has an external circumferential surface that is concavely curved.

4. The rechargeable battery of claim 1, wherein the support members are disposed at respective ends of the length direction of the core.

5. The rechargeable battery of claim 1, wherein the variable member is disposed between the support members.

6. The rechargeable battery of claim 1, wherein the cross-section of the variable member is formed in an arc shape in the length direction.

7. The rechargeable battery of claim 1, wherein the distance from the exterior to the center of the core decreases linearly in the variable member.

8. The rechargeable battery of claim 1, wherein a connection member for connecting variable members is disposed inward of the variable members in the length direction of the core.

9. The rechargeable battery of claim 8, wherein the connection member has a uniform exterior diameter.

10. The rechargeable battery of claim 1, wherein the distance r from the center of the core to the exterior thereof having a minimum exterior diameter and the distance R from a center of the core to an exterior having a maximum exterior diameter satisfies the equation $0.7 \leqq r/R \leqq 0.99$.

11. The rechargeable battery of claim 1, wherein the exterior of the core is concavely curved corresponding to expansion of the electrode assembly.

12. The rechargeable battery of claim 1, wherein the exterior of the core has a circular cross-section.

13. The rechargeable battery of claim 1, wherein a plurality of holes is formed at the exterior of the core.

14. The rechargeable battery of claim 13, wherein the plurality of holes is disposed at the center of the core and is connected in the length direction of the core.

15. The rechargeable battery of claim 13, wherein the plurality of holes is arranged at predetermined distances from each other in the external circumferential direction of the core.

16. The rechargeable battery of claim 1, wherein a hole is formed at the exterior of the core.

17. The rechargeable battery of claim 1, wherein the battery has a cylindrical or prismatic shape.

* * * * *